April 30, 1963 W. K. KERN 3,087,332

WIND TUNNEL DROPLET DISPENSER

Filed June 27, 1961 2 Sheets-Sheet 1

Fig. 1

Fig. 2

INVENTOR.
WERNER K. KERN
BY
Wade Koontz and
Willard R. Matthews, Jr.
ATTORNEYS

April 30, 1963  W. K. KERN  3,087,332
WIND TUNNEL DROPLET DISPENSER
Filed June 27, 1961  2 Sheets-Sheet 2

Fig. 3

INVENTOR.
WERNER K. KERN
BY
Wade Kountz
Willard R. Matthews
ATTORNEYS

United States Patent Office 3,087,332
Patented Apr. 30, 1963

3,087,332
WIND TUNNEL DROPLET DISPENSER
Werner K. Kern, Tallahassee, Fla., assignor to the United States of America as represented by the Secretary of the Air Force Filed June 27, 1961, Ser. No. 120,097
4 Claims. (Cl. 73—147)
(Granted under Title 35, U.S. Code (1952), sec. 266)

The invention described herein may be manufactured and used by or for the United States Government for governmental purposes without payment to me of any royalty thereon.

This invention relates to wind tunnels, and more particularly to a novel droplet dispenser adapted to provide a liquid spray of controllable quality and quantity therein.

Wind tunnels, such as are used in testing aircraft, are commonly provided with means for simulating actual flying conditions. These means include temperature controls, apparatus for varying wind velocity, and liquid dispensing equipment.

In order to realistically correlate wind tunnel data to actual environmental data, a need exists for effective droplet dispenser means capable of filling wind tunnel chambers with controlled amounts of liquid particulates of known droplet size without heating the dispensed liquid significantly above ambient temperature.

Accordingly, it is a principal object of my invention to provide new and improved apparatus for dispensing liquid in a wind tunnel.

It is another primary object of my invention to provide a wind tunnel droplet dispenser adapted to accurately control the quantity and quality of the liquid being dispensed therein.

Still another object of my invention is to provide a wind tunnel liquid dispensing apparatus comprising a plurality of vibrating members in combination with a controllable piezo-electric transducer.

Yet another object of my invention is to provide apparatus adapted to atomize any liquid into minute individual particles of predetermined size.

The above-mentioned and other features and objects of the invention, and the manner of obtaining them will become more apparent by reference to the following description taken in conjunction with the accompanying drawings, wherein:

FIGURE 1 is a perspective view of apparatus embodying my invention;

FIGURE 2 illustrates, diagrammatically, the fluid input end of one vibrating member of the FIGURE 1 apparatus; and FIGURE 3 is a perspective view of a wind tunnel lending itself to practice of my invention.

In essence, my invention comprises a plurality of liquid dispensing members arranged in a parallel relationship within a wind tunnel, the upper ends thereof protruding through the top surface of the wind tunnel envelope in such a manner as to receive metered amounts of liquid, and the lower ends protruding through the bottom surface of said envelope and in contact with piezo-electric crystal vibrating means. I have discovered that a liquid residing on the outer surface of a vibrating member such as the liquid dispensing members comprehended by my invention will collect at points of high amplitude and be dispensed in the form of a jet or spray. Furthermore, the droplet size, or quality of dispensed liquid, has been found to be capable of direct correlation to the frequency of vibration. My invention therefore utilizes this concept by providing a variable frequency piezo-electric transducer, a plurality of liquid dispensing members, and controllable liquid input means in a novel combination adapted to develop a spray of known quantity and quality.

Referring now to FIGURE 1, there is illustrated one presently preferred embodiment of my invention in conjunction with typical wind tunnel 5. The liquid to be dispensed by the present invention is stored in container 6, said container being positioned above the wind tunnel to enable gravity feed through spigot 30. Spigot 30 provides for controlled amounts of liquid to be dispensed through dispensing pan 7. Troughs 8 are arranged below dispensing pan 7 and are supplied with equal amounts of liquid through spigots 27, 28 and 29. Troughs 8 have a plurality of apertures in the bottoms thereof adapted to supply equal amounts of fluid to each of the several liquid dispensing members. The liquid dispensing members comprehended by my invention consist of hollow tubular members having input sections 16, constricted areas 10 and elongated tubular sections 9. Constricted areas 10 are situated within the wind tunnel and are streamlined to minimize turbulence within the tunnel. Input portions 16 are adapted to receive the liquid from troughs 8 in such a manner that it will ultimately flow over the outer surface of constricted area 10. Said input section 16 is illustrated in detail in FIGURE 2, and will be more fully described in conjunction therewith. The several liquid dispensing members are arranged in vertical parallel relationship through the center portion of the wind tunnel as illustrated. Elongated sections 9 of said liquid dispensing members are arranged to protrude through the lower surface of the wind tunnel and are immersed in viscous liquid 13. Container 11 which is located beneath said wind tunnel is provided with cooling coils 12 through which a coolant such as water may be pumped. Piezo-electric crystal 14 is placed within said container 11 and is in direct contact with bottom portions 26 of the several liquid dispensing members, and provides therethrough direct coupling of mechanical vibrations therefrom. Electrical input to piezo-electric crystal 14 is made at points 24 and 25 whereby an input signal is provided therethrough from oscillator 21 and frequency control means 22.

Referring now to FIGURE 2, there is illustrated in detail the droplet dispenser input section. This comprises liquid receptacle 19, said receptacle having a plurality of perforations 18 on the bottom surface thereof. Stopper 20 is inserted in the necvk of constricted portion 10 thereby prohibiting the liquid from collecting within the droplet dispenser. The liquid therefore passes from trough 8 to container 19 and is spread over the outer surface of constricted portion 10 through perforations 18.

In accordance with the principles of my invention, an oscillating signal applied to piezo-electric crystal 14 will cause said crystal to vibrate mechanically which, in turn, causes an extremely vigorous vibration in constricted sections 10 of said liquid dispensing members. The induced vibrations spread the dispensing liquid over these constriction surfaces and throw off said liquid in the form of small jets of spray. I have discovered that the spray emitted from the constriction is not due to ultrasonic heating effects, but is due to cavitation activity at the interface. The liquid, therefore, collects at points of high amplitude within the constriction and it is at these points that the droplets are formed and ejected. Constricted areas 10 are also designed such that their nodal points, when in resonance, are at points that meet with the tunnel walls. This provides for airtight non-gasket junctions allowing for easy insertion and maintenance. In applications where a small amount of liquid leakage is permissible, the restriction may be designed to extend through the wind tunnel walls, as illustrated in FIGURE 1. Since the ultra sonic vibrations are physically small, openings in the tunnel wall need not be extremely large. For example, a liquid dispensing member whose section 9 has a diameter of 2.5 cm. and whose constriction 10 is 7 mm. will produce droplets of 4 to 5 microns when subjected to ultra sonic vibrations from a piezo-electric crystal operating at a frequency of 2.4 megacycles per second.

There has thus been described novel apparatus whereby the several objects of my invention are achieved. While I have described above the principles of my invention in connection with specific apparatus, it is to be clearly understood that this description is made by way of example only and not as a limitation to the scope of my invention as set forth in the objects thereof and in the accompanying claims.

What I claim is:

1. In a wind tunnel, apparatus for providing a liquid spray comprising a plurality of liquid dispensing members arranged in vertical parallel relationship within said wind tunnel, said members consisting of elongated tubular elements having a constricted diameter over a substantial portion thereof, means for coating the outer surface of said members with liquid, means for controllably vibrating said members, and wherein said liquid dispensing members have constricted portions formed in an airfoil configuration, said constricted portions being physically arranged within said wind tunnel such that minimum air flow turbulence is achieved.

2. In a wind tunnel, apparatus for providing a liquid spray comprising a plurality of liquid dispensing members arranged in vertical parallel relationship within said wind tunnel, said members consisting of elongated tubular elements having a constricted diameter over a substantial portion thereof, means for coating the outer surface of said members with liquid, means for controllably vibrating said members, and wherein said means for coating the outer surface of said dispensing members with liquid comprises a controlled fluid input source in combination with fluid receptacle means, said receptacle means comprising a cup formed on the top of each said dispensing member having a plurality of perforations therein adjacent to the outer surface of the constricted portions of said dispensing members.

3. In a wind tunnel, apparatus for providing a liquid spray comprising a plurality of liquid dispensing members arranged in vertical parallel relationship within said wind tunnel, said members consisting of elongated tubular elements having a constricted diameter over a substantial portion thereof, means for coating the outer surface of said members with liquid, means for controllably vibrating said members, and wherein said means for controllably vibrating said members comprises a piezoelectric transducer element in combination with oscillator means and frequency control means, said transducer element being in direct contact with the bottom extremity of said dispensing members.

4. In a wind tunnel, a liquid droplet dispenser comprising a plurality of cylindrical dispensing elements, each of said elements having as an integral part thereof an aerodynamically contoured portion of substantially smaller cross sectional area protruding longitudinally therefrom, said elements being arranged to position said aerodynamically contoured portion in vertical relationship within said wind tunnel with said cylindrical portions protruding through the lower surface thereof, means for distributing controlled amounts of liquid over the outer surface of said aerodynamically contoured portions, and means for inducing longitudinal vibrations in said dispensing elements.

References Cited in the file of this patent
UNITED STATES PATENTS

| | | |
|---|---|---|
| 2,515,069 | Zola | July 11, 1950 |
| 2,740,202 | Fowle | Apr. 3, 1956 |
| 2,744,410 | Browning | May 8, 1956 |
| 2,968,584 | Dickey | Jan. 17, 1961 |